(12) United States Patent
Ikeda et al.

(10) Patent No.: US 9,887,416 B2
(45) Date of Patent: Feb. 6, 2018

(54) NEGATIVE ELECTRODE ACTIVE MATERIAL, AND NEGATIVE ELECTRODE AND LITHIUM ION SECONDARY BATTERY USING THE NEGATIVE ELECTRODE ACTIVE MATERIAL

(71) Applicant: TDK CORPORATION, Tokyo (JP)

(72) Inventors: Yasuhiro Ikeda, Tokyo (JP); Atsushi Sano, Tokyo (JP); Masaki Sobu, Tokyo (JP); Akinobu Nojima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 167 days.

(21) Appl. No.: 14/913,484

(22) PCT Filed: Sep. 26, 2014

(86) PCT No.: PCT/JP2014/075551
§ 371 (c)(1),
(2) Date: Feb. 22, 2016

(87) PCT Pub. No.: WO2015/046393
PCT Pub. Date: Apr. 2, 2015

(65) Prior Publication Data
US 2016/0211509 A1    Jul. 21, 2016

(30) Foreign Application Priority Data
Sep. 30, 2013 (JP) ................. 2013-203684

(51) Int. Cl.
H01M 4/00    (2006.01)
H01M 4/36    (2006.01)
H01M 4/38    (2006.01)
H01M 4/485   (2010.01)
H01M 4/131   (2010.01)
(Continued)

(52) U.S. Cl.
CPC ............ *H01M 4/364* (2013.01); *H01M 4/13* (2013.01); *H01M 4/131* (2013.01); *H01M 4/134* (2013.01); *H01M 4/386* (2013.01); *H01M 4/483* (2013.01); *H01M 4/485* (2013.01); *H01M 10/052* (2013.01); *H01M 10/0525* (2013.01); *H01M 2004/027* (2013.01); *H01M 2220/30* (2013.01)

(58) Field of Classification Search
CPC ....................................................... H01M 4/00
See application file for complete search history.

(56) References Cited

U.S. PATENT DOCUMENTS

2013/0337314 A1* 12/2013 Essaki ............... H01M 4/134
429/163

FOREIGN PATENT DOCUMENTS

| JP | 2001-015101 A | 1/2001 |
| JP | 2002-170561 A | 6/2002 |
| JP | 2004-055505 A | 2/2004 |

* cited by examiner

*Primary Examiner* — Jacob Marks
(74) *Attorney, Agent, or Firm* — Oliff PLC

(57) ABSTRACT

Provided are a negative electrode active material for a lithium ion secondary battery, which has sufficiently high discharge capacity at a high rate. The negative electrode active material containing silicon and silicon oxide includes primary particles having two phases of different compositions therein. One of the two phases has a higher silicon element concentration than the other phase, and is a fibrous phase forming a network structure in a cross section of the primary particle. Use of the negative electrode active material enables a sufficient increase in discharge capacity at a high rate.

18 Claims, 2 Drawing Sheets

(51) Int. Cl.
*H01M 4/134* (2010.01)
*H01M 4/48* (2010.01)
*H01M 4/13* (2010.01)
 H01M 10/052 (2010.01)
 H01M 10/0525 (2010.01)
 H01M 4/02 (2006.01)

NEGATIVE ELECTRODE ACTIVE MATERIAL, AND NEGATIVE ELECTRODE AND LITHIUM ION SECONDARY BATTERY USING THE NEGATIVE ELECTRODE ACTIVE MATERIAL

TECHNICAL FIELD

The present invention relates to a negative electrode active material, and a negative electrode and a lithium ion secondary battery using the negative electrode active material.

BACKGROUND ART

A lithium ion secondary battery is lighter in weight and has higher capacity than a nickel-cadmium battery, a nickel hydrogen battery, or the like. For this reason, the lithium ion secondary batteries have been widely used as a power supply for mobile electronic appliances. The lithium ion secondary battery is also a strong candidate for a power supply to be mounted on hybrid automobiles and electric automobiles. Moreover, with the size reduction and higher sophistication of the mobile electronic appliances in recent years, the lithium ion secondary battery used for the power supply is expected to have higher capacity.

The capacity of a lithium ion secondary battery mainly depends on an active material of an electrode. As a negative electrode active material, graphite is typically used. To meet the above demand, however, it is necessary to use a negative electrode active material with higher capacity. In view of this, metal silicon (Si) with much higher theoretical capacity (4210 mAh/g) than that of graphite (372 mAh/g) has attracted attention.

An example of the negative electrode active material using such metal silicon includes a mixture of silicon and silicon oxide. In the case of using the mixture of silicon and silicon oxide, the stress due to the expansion and contraction of silicon at the time of charging and discharging is relieved by silicon oxide. Thus, this mixture is supposed to be superior to silicon in cycle characteristics. On the other hand, the mixture of silicon and silicon oxide has low electric conductivity. Therefore, the discharge capacity is remarkably decreased when the current density at the time of discharging is high relative to the battery capacity. In view of this, an increase in discharge capacity at a high rate has been an important issue to enable the battery to be used as a power supply for hybrid automobiles and electric automobiles.

In the technique suggested to mitigate the decrease in discharge capacity at a high rate, the surface of the active material is covered with carbon to allow the negative electrode active material layer to have higher electric conductivity and higher discharge capacity at a high rate.

LIST OF CITATION

Patent Literatures

PATENT LITERATURE 1: JP-A-2001-15101
PATENT LITERATURE 2: JP-A-2004-55505

SUMMARY OF THE INVENTION

Problem to be Solved

However, the improvement in the negative electrode active material itself is not observed in the methods disclosed in Patent Literatures 1 and 2. Therefore, the improvement is not essential, and is not sufficient.

The present invention has been made in view of the above problem of the conventional technique. An object of the present invention is to provide a negative electrode active material with sufficiently high discharge capacity at a high rate, and a negative electrode and a lithium ion secondary battery using the negative electrode active material.

Solution to the Problem

A negative electrode active material according to the present invention contains silicon and silicon oxide, and includes primary particles having two phases of different compositions therein. One of the phases has a higher silicon element concentration than the other phase, and the one phase is a fibrous phase forming a network structure in a cross section of the primary particle.

The negative electrode active material having such configuration enables sufficiently high discharge capacity to be maintained even at a high rate.

In the negative electrode active material according to the present invention, the one phase and the other phase are preferably both amorphous.

Thus, the discharge capacity at a high rate is significantly increased.

In the cross section of the primary particle of the negative electrode active material according to the present invention, the area ratio of the fibrous phase forming a network structure per unit area is preferably 5.8% or more and 30.1% or less.

Thus, the discharge capacity at a high rate is further increased.

The width of the fibrous phase forming a network structure as observed in the cross section of the primary particle of the negative electrode active material according to the present invention is preferably 0.29 nm or more and 9.72 nm or less.

Thus, the discharge capacity at a high rate is significantly increased.

The fibrous phase forming a network structure of the negative electrode active material according to the present invention has mutually intersecting intersection points. The average distance between the intersection points is preferably 4.5 nm or more and 72.2 nm or less.

Thus, sufficiently high discharge capacity can be obtained even at a high rate.

The other phase of the negative electrode active material according to the present invention preferably contains a compound expressed by $Li_xSiO_y$ ($2 \leq x \leq 4$, $3 \leq y \leq 4$).

Thus, the discharge capacity at a high rate is significantly increased.

By using the negative electrode active material according to the present invention in a negative electrode containing a binder and the above-described negative electrode active material on a current collector, a negative electrode having high discharge capacity even at a high rate can be obtained.

By using the negative electrode active material according to the present invention in a lithium ion secondary battery having a positive electrode, the negative electrode, a separator disposed therebetween, and an electrolyte solution, a battery with high discharge capacity even at a high rate can be obtained.

Effects of the Invention

According to the present invention, a negative electrode active material with sufficiently high discharge capacity even at high rate, and a negative electrode and a lithium ion secondary battery using the negative electrode active material can be provided.

DESCRIPTION OF THE EMBODIMENT

Figure 1:
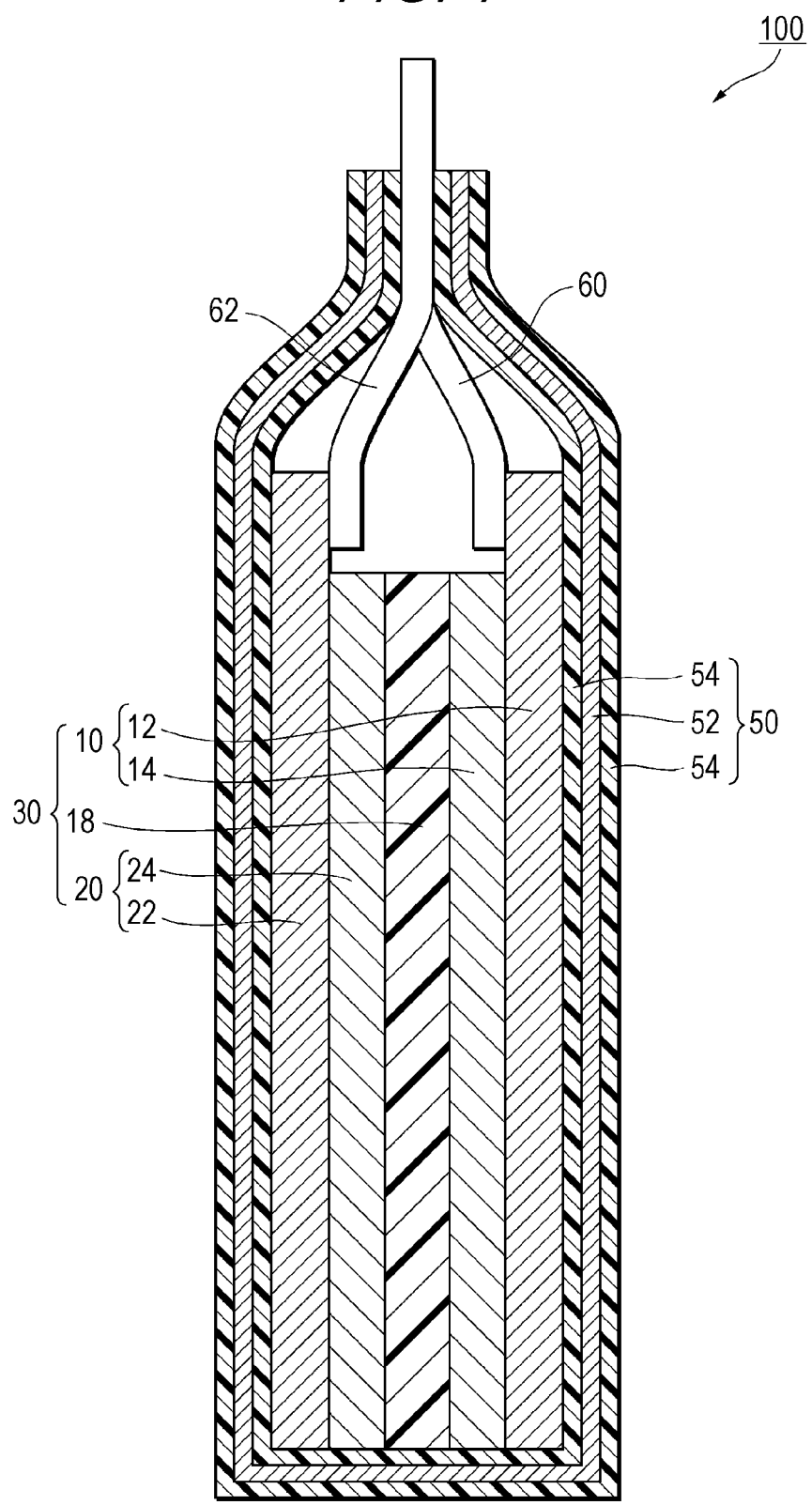
FIG. 1 is a sectional view of a lithium ion secondary battery according to an embodiment of the present invention.

In the following, a preferred embodiment of the present invention will be described in detail with reference to the drawings as needed. In the drawings, the same or corresponding portions are designated with the same reference numerals, and the redundant description is omitted. The dimensional ratios in the drawings are not limited to the ratios shown in the drawings.

(Lithium Ion Secondary Battery)

FIG. 1 is a schematic sectional view illustrating a lithium ion secondary battery according to this embodiment. As illustrated in FIG. 1, the lithium ion secondary battery 100 includes a stacked body 30, and an electrolyte solution containing lithium ions. The stacked body 30 includes a positive electrode 10, a negative electrode 20 provided opposite to the positive electrode 10, and a separator 18. The separator 18 is interposed between the positive electrode 10 and the negative electrode 20 and is in contact with both a principal surface of the positive electrode 10 and a principal surface of the negative electrode 20.

The lithium ion secondary battery 100 mainly includes the stacked body 30, a case 50 sealed with the stacked body 30 housed therein, and a pair of leads 60 and 62 connected to the stacked body 30.

The positive electrode 10 includes a positive electrode current collector 12, and a positive electrode active material layer 14 formed on the positive electrode current collector 12. The negative electrode 20 includes a negative electrode current collector 22, and a negative electrode active material layer 24 formed on the negative electrode current collector 22. The separator 18 is positioned between the negative electrode active material layer 24 and the positive electrode active material layer 14. The case 50 is formed of, for example, a metal laminated film.

(Positive Electrode Active Material Layer)

The positive electrode active material layer 14 is formed on the positive electrode current collector 12. The positive electrode active material layer 14 contains at least a positive electrode active material and a conductive auxiliary agent described below. Examples of the conductive auxiliary agent include: a carbon material such as carbon blacks; metal powder of copper, nickel, stainless steel, iron or the like; a mixture of the carbon material and metal powder; and a conductive oxide such as ITO. The carbon material preferably includes carbon with a tap density of 0.03 to 0.09 g/ml and carbon with a tap density of 0.1 to 0.3 g/ml.

The positive electrode active material layer may include a binder that binds the active material and the conductive auxiliary agent. The positive electrode active material layer 14 is formed through a process of applying, on the positive electrode current collector 12, a coating including the active material, binder, solvent, and conductive auxiliary agent.

(Positive Electrode Current Collector)

As the positive electrode current collector 12, any conductive plate material may be used. Examples of the conductive plate material include metal thin plates (metal foil) of aluminum, copper, nickel, and an alloy thereof.

(Positive Electrode Active Material)

Examples of the positive electrode active material of the lithium ion secondary battery according to the embodiment include compounds cited below. Any well-known active material can be used without any particular limitations, as long as the active material can reversibly advance the intercalation and deintercalation of lithium ions or the doping and de-doping between lithium ions and counter anions of the lithium ions (such as $PF_6^-$).

The examples include lithium cobaltate ($LiCoO_2$), lithium nickelate ($LiNiO_2$), lithium manganese spinel ($LiMn_2O_4$), a complex metal oxide expressed by the general formula $LiNi_aCo_bMn_cM_dO_2$ (a+b+c+d=1, 0≤a≤1, 0≤b≤1, 0≤c≤1, 0≤d≤1, where M represents one or more kinds of elements selected from Al, Mg, Nb, Ti, Cu, Zn, and Cr), a lithium vanadium compound ($LiV_2O_5$), olivine $LiMPO_4$ (where M represents one or more kinds of elements selected from Co, Ni, Mn, Fe, Mg, Nb, Ti, Al, and Zr, or VO), and a composite metal oxide such as lithium titanate ($Li_4Ti_5O_{12}$).

(Binder)

The binder binds between the positive electrode active materials together, and also binds the positive electrode active material and the positive electrode current collector 12. The binder may be any binder capable of achieving the above binding. Examples of the binder include fluorine resin such as polyvinylidene fluoride (PVDF) and polytetrafluoroethylene (PTFE). Other examples include polyimide resin, polyamide-imide resin, and thermoplastic elastomeric polymer such as styrene-butadiene-styrene block copolymer (SBR), cellulose, ethylene-propylene-diene rubber (EPDM), hydrogen additives thereof, styrene-ethylene-butadiene-styrene copolymer, styrene-isoprene-styrene block copolymer, and hydrogen additives thereof.

(Negative Electrode Active Material Layer)

The negative electrode active material layer 24 is formed on the negative electrode current collector 22. The negative electrode current collector 22 may be formed of any conductive plate material. Examples of the conductive plate material include metal thin plates (metal foil) of aluminum, copper, nickel, stainless steel, and alloys thereof. The negative electrode active material layer 24 is formed mainly of the negative electrode active material, binder, and a required amount of conductive auxiliary agent.

(Negative Electrode Active Material)

The negative electrode active material according to the embodiment is a negative electrode active material that contains silicon and silicon oxide. The negative electrode active material has two phases with different compositions in the primary particle thereof. One phase has a silicon element concentration higher than that of the other phase. Further, the one phase is characterized by being a fibrous phase forming a network structure in a cross section of the primary particle of the negative electrode active material.

When the portion mostly contributing to charging and discharging is formed as the fibrous phase forming a network structure, the reactive area of alloying reaction with lithium ions at the time of charging and discharging is increased. This, it is supposed, enables an increase in discharge capacity at a high rate.

The one phase and the other phase are preferably both amorphous.

Being amorphous provides the negative electrode active material with high strength. As a result, the expansion and contraction associated with charging and discharging can be relieved, whereby a decrease in conductivity due to a decrease in the density of the negative electrode active material layer can be suppressed.

In the negative electrode active material according to the embodiment, the ratio of silicon oxide to silicon is preferably in a range of 1:1 to 1:10. When the ratio of silicon oxide to silicon is in the above range, the silicon volume expansion associated with charging and discharging can be suppressed while the high discharge capacity of silicon is sufficiently exhibited.

The primary particles of the negative electrode active material containing the silicon and silicon oxide preferably have a primary particle diameter of 100 nm or more and 15 μm or less. The primary particles of the negative electrode active material containing the silicon and silicon oxide more preferably have a particle diameter of 1 μm or more and 8 μm or less.

If the primary particle diameter of the negative electrode active material containing the silicon and silicon oxide does not reach the above range, the formation of the fibrous phase forming a network structure may become insufficient. As a result, the reactive area may fail to be more sufficiently increased, possibly resulting in a failure to obtain the best characteristics in terms of discharge capacity at a high rate. If the primary particle diameter of the negative electrode active material containing the silicon and silicon oxide exceeds the above range, the Li diffusion path may become increased. As a result, it may become difficult for the inside of the primary particle to contribute to charging and discharging reactions, possibly resulting in a deterioration in cycle characteristics.

In a cross section of the primary particle, the area ratio of the fibrous phase forming a network structure per unit area is preferably 5.8% or more and 30.1% or less. More preferably, in the cross section, the area ratio of the fibrous phase forming a network structure per unit area is 18.3% or more and 26.7% or less.

If the area ratio of the fibrous phase forming a network structure per unit area in the cross section does not reach the above range, the formation of the fibrous phase forming a network structure may become insufficient. As a result, the reactive area may fail to be more sufficiently increased, whereby the best characteristics in terms of discharge capacity at a high rate may not be obtained. If the area ratio of the fibrous phase forming a network structure per unit area in the cross section exceeds the above range, the amount of silicon may become excessive. As a result, the expansion and contraction may fail to be suppressed, possibly resulting in a deterioration in cycle characteristics.

The width of the fibrous phase forming a network structure as observed in the cross section of the primary particle of the negative electrode active material is preferably 0.29 nm or more and 9.72 nm or less. More preferably, the width of the fibrous phase forming a network structure as observed in the cross section of the primary particle of the negative electrode active material is 4.0 nm or more and 6.25 nm or less.

If the width of the fibrous phase forming a network structure as observed in the cross section of the primary particle of the negative electrode active material does not reach the above range, the strength of the fibrous phase may become insufficient. As a result, the cycle characteristics may deteriorate due to the expansion and contraction at the time of charging and discharging. If the width of the fibrous phase forming a network structure as observed in the cross section of the primary particle of the negative electrode active material exceeds the above range, the surface area of the fibrous phase forming a network structure may fail to be sufficiently increased. As a result, the best characteristics in terms of discharge capacity at a high rate may fail to be obtained.

The fibrous phase forming a network structure has mutually intersecting intersection points. The intersection points have an average distance of preferably 4.5 nm or more and 72.2 nm or less. More preferably, the intersection points have an average distance of 30.3 nm or more and 55.5 nm or less.

If the average distance between the intersection points does not reach the above range, the amount of silicon may become excessive. As a result, the expansion and contraction may fail to be suppressed, possibly resulting in a deterioration in cycle characteristics. If the average distance between the intersection points exceeds the above range, the fibrous phase forming a network structure having a large amount of silicon may fail to sufficiently permeate the inside of the active material. Consequently, the best characteristics in terms of discharge capacity at high rate may not be obtained due to a decrease in ion conductivity.

The other phase preferably contains a compound expressed by $Li_xSiO_y$ ($2 \leq x \leq 4$, $3 \leq y \leq 4$).

Because lithium is contained in the region with a small silicon substance amount, the apparent transport speed of lithium increases. As a result, the discharge capacity at a high rate is increased.

The element concentration of silicon in the one phase and the other phase can be measured by electron energy loss spectroscopy (EELS).

The fibrous phase forming a network structure can be confirmed by observing the cross section of the negative electrode active material by STEM. The confirmation as to whether the phase is amorphous can be made based on electron beam diffraction on the cross section of the negative electrode active material.

The area ratio of the fibrous phase forming a network structure per unit area in the cross section of the negative electrode active material can be measured by the following procedure. The cross section of the negative electrode active material is captured by STEM. In a cross section of a freely-selected primary particle of the negative electrode active material, a square region of 100 nm×100 nm is freely selected. The area of the fibrous phase forming a network structure in the region is measured. Then, the area ratio is calculated by area ratio=(area of the fibrous phase forming a network structure)/(area of the square measuring 100 nm×100 nm). The above operation is performed with respect to freely-selected 10 locations in the same particle and freely-selected 100 particles. An average value of the area ratios obtained by the above method is taken as the area ratio of the one phase per unit area in the cross section of the negative electrode active material.

Figure 3:
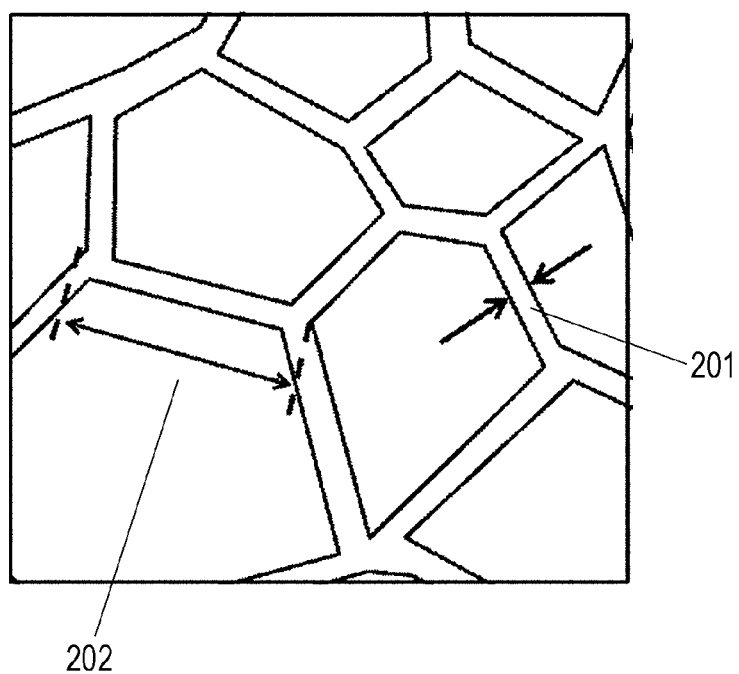
FIG. 3 is a schematic view of the cross section of the negative electrode active material.

The width of the fibrous phase forming a network structure and the average distance between the intersection points can be obtained as follows. Using STEM, the cross section of the negative electrode active material is captured. Using an obtained STEM image, length measurement is performed. FIG. 3 is a schematic view of the cross section of the negative electrode active material. The width 201 of the fibrous phase forming a network structure and the average distance 202 between the intersection points are provided by average values of values obtained by performing length measurement with respect to freely-selected eight locations in a single particle and freely-selected 100 particles. The arbitrary eight locations in the single particle for obtaining the width of the fibrous phase forming a network structure are determined by the following method. First, four lines are drawn so as to have an intersection point positioned at approximately the center of the particle and so as to divide the particle into eight portions. The adjacent lines form an angle of 45°. Using these lines, the width of the fibrous phase intersected by the lines is taken as the value of the width of the fibrous phase. The average distance between the intersection points is calculated by the following method. First, one fibrous phase extending approximately linearly is selected. Then, the distance between the points on both ends of the phase where a plurality of fiber shapes converge is measured as shown in the schematic view of FIG. 3. The distance is measured with respect to freely-selected different eight locations, and the distances are averaged to calculate the average distance between the intersection points.

For the binder and conductive auxiliary agent used for the negative electrode active material layer, the same material as used in the above-described positive electrode 10 can be used. The content of the binder and conductive auxiliary agent may also be the same as that of the above-described positive electrode 10, except when it is necessary to take the magnitude of volume change in the negative electrode active material and adhesion with the foil into consideration.

The electrodes 10 and 20 can be fabricated by the conventional method. For example, the coating including the active material, binder, solvent, and conductive auxiliary agent is applied on the current collector, and then the solvent is removed out of the coating applied on the current collector, so that the electrodes can be fabricated.

Examples of the solvent that can be used include N-methyl-2-pyrrolidone and N,N-dimethylformamide.

The coating method is not particularly limited. A method that is normally adopted to fabricate electrodes may be used. Examples of the coating method include a slit die coating method and a doctor blade method.

The method of removing the solvent from the coating applied on the current collectors 12 and 22 is not particularly limited. The current collectors 12 and 22 with coating applied thereon may be dried in an atmosphere of 80° C. to 150° C., for example.

The electrodes with the active material layers 14 and 24 formed thereon in this manner may be thereafter pressed using a roll pressing device or the like as necessary. The linear pressure of the roll pressing may be 10 to 50 kgf/cm, for example.

(Method for Fabricating Negative Electrode Active Material)

The negative electrode active material according to the embodiment may be fabricated as follows. For example, a negative electrode active material containing amorphous silicon (Si) and silicon oxide $SiO_2$ at the silicon-to-silicon oxide ratio of 1:5 is heated in vacuum at 350° C., and then quenched to produce cracks in the negative electrode active material due to different thermal expansion rates. The material is then fired in a hydrogen atmosphere, whereby the crack portions are reduced and a phase containing silicon and silicon oxide and having high silicon element concentration is formed on the crack surface. The material is again sintered in vacuum at 350° C. to produce a negative electrode active material having two phases with different compositions in the active material. Of the two phases, one phase has a higher silicon element concentration than the other phase. Further, the one phase is a fibrous phase forming a network structure in the cross section of the primary particle of the negative electrode active material.

When it is desired to dope the negative electrode active material with lithium, lithium doping may be performed by impregnating the negative electrode active material in a solution including lithium.

Next, constituent elements of the lithium ion secondary battery 100 other than the electrodes will be described.

(Separator)

The separator is not particularly limited as long as the separator is stable relative to the electrolyte solution and has the good liquid retaining property. General examples thereof include porous sheets of polyolefin such as polyethylene or polypropylene, and nonwoven fabrics.

(Electrolyte)

The electrolyte is contained in the positive electrode active material layer 14, the negative electrode active material layer 24, and the separator 18. The electrolyte is not particularly limited. For example, according to the embodiment, an electrolyte solution including lithium salt (electrolyte aqueous solution or electrolyte solution using organic solvent) may be used. The electrolyte aqueous solution, however, has an electrochemically low decomposition voltage, so that the withstand voltage at the time of charging is restricted to a low value. For this reason, the electrolyte is preferably an electrolyte solution using organic solvent (nonaqueous electrolyte solution). As the electrolyte solution, an electrolyte solution obtained by dissolving lithium salt in a nonaqueous solvent (organic solvent) may preferably be used. The lithium salt is not particularly limited, and any lithium salt that can be used as electrolyte in a lithium ion secondary battery may be used. Examples of the lithium salt that can be used include inorganic acid anionic salt such as $LiPF_6$ and $LiBF_4$, $LiCF_3SO_3$, and organic acid anionic salt such as $(CF_3SO_2)_2NLi$.

Examples of the organic solvent include aprotonic high-dielectric constant solvent such as ethylene carbonate and propylene carbonate; acetates such as dimethyl carbonate and ethylmethyl carbonate; and aprotonic low-viscosity solvent such as propionate esters. Preferably, the aprotonic high-dielectric constant solvent and the aprotonic low-viscosity solvent may be mixed at an appropriate ratio. Further, an ionic liquid using imidazolium, ammonium, or pyridinium cations may be used. The counter anion is not particularly limited. Examples of the counter anion include $BF_4^-$, $PF_6^-$, and $(CF_3SO_2)_2N^-$. The ionic liquid and the organic solvent may be mixed to be used.

From the viewpoint of electric conductivity, the concentration of the lithium salt in the electrolyte solution is preferably 0.5 to 2.0 M. The conductivity of the electrolyte at the temperature of 25° C. is preferably 0.01 S/m or more. The concentration is adjusted depending on the type and concentration of the electrolyte salt.

Moreover, in the electrolyte solution according to the embodiment, various kinds of additive may be added as needed. Examples of the additive include vinylene carbonate and methylvinylene carbonate for the purpose of improving the cycle life, biphenyl and alkylbiphenyl for the purpose of preventing the overcharge, various carbonate compounds, various carboxylic acid anhydrides and various nitrogen- or sulfur-containing compounds for the purpose of deoxidation and dehydration.

(Case)

The case 50 houses the stacked body 30 and the electrolyte solution and is sealed. The case 50 is not particularly limited as long as it is capable of suppressing the leakage of the electrolyte solution to the outside and entry of moisture or the like from the outside into the lithium ion secondary battery 100. For example, as the case 50, a metal laminated film obtained by coating a metal foil 52 with a polymer film 54 on each side, as illustrated in FIG. 1, may be used. An example of the usable metal foil 52 is an aluminum foil. An example of the usable polymer film 54 is a film of polypropylene or the like. For example, the material for the polymer film 54 on the outer side is preferably a high-melting point polymer. Preferable examples of the polymer include polyethylene terephthalate (PET) and polyamide. The material for the polymer film 54 on the inner side is preferably polyethylene (PE) or polypropylene (PP), or like.

(Lead)

The leads 60 and 62 are formed of a conductive material such as aluminum. The leads 62 and 60 are respectively welded to the negative electrode current collector 22 and the positive electrode current collector 12 by the known method. Then, the positive electrode active material layer 14 of the positive electrode 10 and the negative electrode active material layer 24 of the negative electrode 20 are inserted into the case 50 together with the electrolyte solution, with the separator 18 interposed between the layers. The opening of the case 50 can then be sealed.

The preferred embodiment of the present invention has been described so far. The present invention, however, is not limited to the embodiment. For example, the shape of the lithium ion secondary battery is not limited to the shape illustrated in FIG. 1. The shape may be of a coin type obtained by stacking the electrodes and separator that are punched into a coin shape, or a cylinder type obtained by winding the electrode sheets and separator in a spiral shape.

EXAMPLES

In the following, the present invention will be described more specifically with reference to examples and a comparative example. However, the present invention is not limited to the following examples.

Example 1

(Fabrication of Negative Electrode Active Material)

The negative electrode active material containing silicon (Si) and silicon oxide ($SiO_2$) at the silicon-to-silicon oxide ratio of 1:5 was heated in vacuum at 350° C., and then quenched to produce cracks in the active material due to different thermal expansion rates. The material was then fired in hydrogen atmosphere (0.5 atm) so as to reduce the crack portions and increase the silicon element concentration on the crack surface. The material was again sintered in vacuum at 350° C. In this manner, the negative electrode active material including two phases of different compositions was obtained. Of the two phases, one phase had a higher silicon element concentration than the other phase. In addition, the one phase included a fibrous phase forming a network structure in the cross section of the primary particle of the negative electrode active material.

(STEM Observation of Negative Electrode Active Material)

Figure 2:
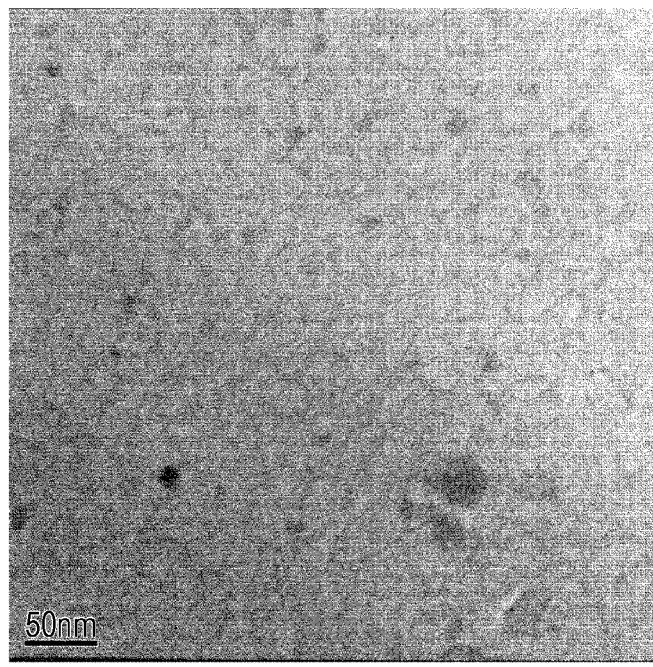
FIG. 2 is a STEM observation image of a negative electrode active material.

FIG. 2 is a STEM image of the obtained negative electrode active material. It can be confirmed from the STEM image that inside the primary particles of the active material, two phases of different compositions are present, of which one phase is a fibrous phase forming a network structure in cross section and uniformly spread in the primary particle of the negative electrode active material. Of the obtained negative electrode active material, the area ratio of the fibrous phase forming a network structure per unit area of cross section, the width of the fibrous phase, and the average distance between the intersection points were measured. The results are shown in Table 1.

(Electron Beam Diffraction of Negative Electrode Active Material)

The fibrous phase forming a network structure and the other phase in the cross section of the obtained negative electrode active material were subjected to electron beam diffraction. As a result, it was confirmed that the fibrous phase and the other phase were both amorphous.

(EELS Measurement of Negative Electrode Active Material)

The fibrous phase forming a network structure and the other phase in the cross section of the obtained negative electrode active material were subjected to EELS measurement. The silicon element concentration ratio of the fibrous phase and the other phase (the silicon element concentration in the fibrous phase forming a network structure/the silicon element concentration in the other phase) was measured. The results are shown in Table 1.

(Fabrication of Negative Electrode)

A slurry for forming the active material layer was prepared by mixing 83 parts by mass of the negative electrode active material fabricated by the above method, 2 parts by mass of acetylene black, 15 parts by mass of polyamide-imide, and 82 parts by mass of N-methyl pyrrolidone. This slurry was applied over a surface of a copper foil with a thickness of 14 μm so as to result in an active material coated amount of 2.0 mg/cm$^2$. The slurry was then dried at 100° C., thereby forming an active material layer. Thereafter, the negative electrode was pressed and molded by roll pressing. The electrode was then heated in vacuum at 350° C. for three hours, so that the negative electrode with the 19-μm-thick active material layer was obtained.

(Fabrication of Lithium Ion Secondary Battery for Evaluation)

The negative electrode fabricated as above and a copper foil with a lithium metal foil affixed thereto as a counter electrode were put in an aluminum laminated pack, together with a separator formed of a polyethylene fine porous film held between the electrodes. Into the aluminum laminated pack, 1 M of $LiPF_6$ solution (solvent: EC/DEC=3/7 (volume ratio)) was poured as an electrolyte solution. This was followed by vacuum sealing, whereby a lithium ion secondary battery for evaluation was fabricated.

Examples 2 to 18

The negative electrode active materials according to Examples 2 to 18 were obtained by the same method as in Example 1 except that the cooling speed of the heating process was 200° C./min or 800° C./min, and that the hydrogen pressure was changed in a range of from 0.4 atm to 2.5 atm. The obtained negative electrode active materials were evaluated by STEM observation. As a result, it was confirmed that two phases of different compositions were present inside, of which one phase was a fibrous phase forming a network structure in a cross section of the primary particle of the negative electrode active material. Further, the cross section of the obtained negative electrode active materials was subjected to electron beam diffraction. As a result, it was confirmed that, as in Example 1, two phases of different compositions were both amorphous.

As in Example 1, STEM and EELS were used to measure the area ratio of the fibrous phase forming a network structure per unit area in the cross section of the active material, the width of the fibrous phase forming a network structure, and the average distance between the intersection points.

The negative electrodes and lithium ion secondary batteries for evaluation according to Examples 2 to 18 were fabricated by the same method as in Example 1, using the obtained negative electrode active materials.

Comparative Example 1

A negative electrode and a lithium ion secondary battery for evaluation according to Comparative Example 1 were fabricated in the same manner as in Example 1 except that the active material was not subjected to the vacuum heating process and the like and therefore the negative electrode active material that did not form a network structure was used.

(Measurement of Discharge Capacity at High Rate)

With respect to the lithium ion secondary batteries for evaluation fabricated according to Examples and Comparative Example, charging and discharging were performed using a secondary battery charging and discharging test device (manufactured by HOKUTO DENKO CORPORATION). The charging and discharging were performed in a voltage range of from 0.005 V to 2.5 V at current values of 0.05 C and 5 C, where 1 C=1600 mAh/g. Thus, the discharge capacity at 5 C relative to the discharge capacity at 0.05 C (discharge capacity retention) was determined. The results are shown in Table 1.

INDUSTRIAL APPLICABILITY

The negative electrode active material according to the present invention makes it possible to provide a lithium ion secondary battery capable of maintaining sufficiently high discharge capacity at a high rate. In addition, the negative electrode active material can be widely used in devices using the lithium ion secondary battery, and is therefore beneficial.

LIST OF NUMERAL REFERENCES

10 Positive electrode
12 Positive electrode current collector
14 Positive electrode active material layer
18 Separator
20 Negative electrode
22 Negative electrode current collector
24 Negative electrode active material layer
30 Stacked body
50 Case
52 Metal foil
54 Polymer film
60, 62 Lead
100 Lithium ion secondary battery
201 Width of fibrous phase
202 Distance between intersection points

TABLE 1

| | Cooling rate (° C./sec) | Hydrogen pressure (atm) | Silicon element concentration (fibrous phase forming network structure/ other phase) | Area ratio of fibrous phase forming network structure per unit area (%) | Width of fiber shape in cross section of active material (nm) | Average distance between intersection points (nm) | Discharge capacity retention (%) |
|---|---|---|---|---|---|---|---|
| Example 1 | 500 | 0.5 | 1.27 | 20.1 | 5.05 | 35.3 | 72.2 |
| Example 2 | 500 | 1.0 | 1.44 | 18.8 | 4.15 | 30.9 | 71.8 |
| Example 3 | 500 | 1.5 | 1.51 | 17.9 | 3.95 | 25.2 | 67.5 |
| Example 4 | 500 | 2.0 | 1.62 | 17.2 | 3.35 | 19.8 | 67.2 |
| Example 5 | 500 | 2.5 | 1.69 | 16.1 | 2.8 | 17.6 | 66.8 |
| Example 6 | 800 | 1.0 | 1.72 | 7.7 | 2.15 | 12.9 | 65.1 |
| Example 7 | 800 | 1.5 | 1.93 | 6.9 | 1.4 | 9.8 | 64.8 |
| Example 8 | 800 | 2.0 | 2.09 | 6.3 | 0.29 | 6.5 | 64.7 |
| Example 9 | 800 | 2.5 | 2.32 | 5.8 | 0.45 | 4.5 | 64.5 |
| Example 10 | 200 | 0.5 | 1.01 | 30.1 | 9.72 | 72.2 | 66.5 |
| Example 11 | 200 | 1.0 | 1.09 | 28.8 | 7.2 | 67.1 | 67.3 |
| Example 12 | 200 | 1.5 | 1.21 | 27.6 | 6.6 | 62.3 | 67.8 |
| Example 13 | 200 | 2.0 | 1.24 | 26.7 | 6.25 | 55.5 | 68.8 |
| Example 14 | 200 | 2.5 | 1.34 | 25.9 | 5.6 | 45.9 | 71.5 |
| Example 15 | 500 | 0.8 | 1.5 | 26.9 | 4 | 30.1 | 67.9 |
| Example 16 | 500 | 0.4 | 1.26 | 22.9 | 5.72 | 51.8 | 71.9 |
| Example 17 | 200 | 0.8 | 1.23 | 18.3 | 6.34 | 56 | 68.1 |
| Example 18 | 200 | 0.4 | 1.48 | 18.4 | 4.1 | 30.3 | 69.9 |
| Comparative Example 1 | — | — | — | — | — | — | 60.1 |

The results in Table 1 show that the negative electrode active materials having two phases of different compositions in the primary particles of which one phase has a higher silicon element concentration than the other phase, the one phase being a fibrous phase forming a network structure in a cross section of the primary particle, exhibited higher discharge capacity retention at a high rate than the case where the negative electrode active material without having the one phase was used.

The invention claimed is:

1. A negative electrode active material containing silicon and silicon oxide, and comprising primary particles having two phases of different compositions therein, wherein one of the phases has a higher silicon element concentration than the other phase, and the one phase is a fibrous phase forming a network structure in a cross section of the primary particle.

2. The negative electrode active material according to claim 1, wherein the one phase and the other phase are both amorphous.

3. The negative electrode active material according to claim 1, wherein, in the cross section of the primary particle, an area ratio per unit area of the fibrous phase forming the network structure is 5.8% or more and 30.1% or less.

4. The negative electrode active material according to claim 1, wherein a width of the fibrous phase forming the network structure observed in the cross section of the primary particle is 0.29 nm or more and 9.72 nm or less.

5. The negative electrode active material according to claim 1, wherein
the fibrous phase forming the network structure has mutually intersecting intersection points, and
an average distance between the intersection points is 4.5 nm or more and 72.2 nm or less.

6. The negative electrode active material according to claim 1, wherein the other phase contains a compound expressed by $Li_xSiO_y$ ($2 \leq x \leq 4$, $3 \leq y \leq 4$).

7. A negative electrode comprising a binder and the negative electrode active material according to that are disposed on a current collector.

8. A lithium ion secondary battery comprising:
a positive electrode;
the negative electrode according to claim 7;
a separator disposed between the positive electrode and the negative electrode; and
an electrolyte solution.

9. A negative electrode comprising a binder and the negative electrode active material according to claim 2 that are disposed on a current collector.

10. A negative electrode comprising a binder and the negative electrode active material according to claim 3 that are disposed on a current collector.

11. A negative electrode comprising a binder and the negative electrode active material according to claim 4 that are disposed on a current collector.

12. A negative electrode comprising a binder and the negative electrode active material according to claim 5 that are disposed on a current collector.

13. A negative electrode comprising a binder and the negative electrode active material according to claim 6 that are disposed on a current collector.

14. A lithium ion secondary battery comprising:
a positive electrode;
the negative electrode according to claim 9;
a separator disposed between the positive electrode and the negative electrode; and
an electrolyte solution.

15. A lithium ion secondary battery comprising:
a positive electrode;
the negative electrode according to claim 10;
a separator disposed between the positive electrode and the negative electrode; and
an electrolyte solution.

16. A lithium ion secondary battery comprising:
a positive electrode;
the negative electrode according to claim 11;
a separator disposed between the positive electrode and the negative electrode; and
an electrolyte solution.

17. A lithium ion secondary battery comprising:
a positive electrode;
the negative electrode according to claim 12;
a separator disposed between the positive electrode and the negative electrode; and
an electrolyte solution.

18. A lithium ion secondary battery comprising:
a positive electrode;
the negative electrode according to claim 13;
a separator disposed between the positive electrode and the negative electrode; and
an electrolyte solution.

* * * * *